Feb. 14, 1928.

Z. P. CANDEE

WHEEL

Filed May 7, 1926

1,659,311

INVENTOR
Zenas P. Candee
BY
ATTORNEY

Patented Feb. 14, 1928.

1,659,311

UNITED STATES PATENT OFFICE.

ZENAS P. CANDEE, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

WHEEL.

Application filed May 7, 1926. Serial No. 107,432.

This invention relates to a new and improved wheel, referring more particularly to a type of driving wheel through which power is transmitted to machine parts.

It is the object of this invention to produce a wheel that would operate in connection with a press clutch of the ordinary positive type, so as to minimize the shock of starting up the mechanism in back of the clutch, also to avoid vibrations of such mechanism after the machine is started, or when performing the work.

To these and other ends, my invention consists in the wheel, having certain details of construction and combinations of parts, as will be hereinafter described and more particularly pointed out in the claims.

Referring to the drawings, in which like numerals of reference designate like parts in the several figures.

In the type of driving wheel now in common use, the hub, rim and flange are integral with each other.

When used with a key clutch, wherein the key is slidably mounted in a shaft or a part connected therewith, and moved into and out of engagement with the wheel hub, the shock upon the shaft and the parts associated therewith is so severe as to frequently cause breakage, when the wheel is driven at more than the average speed. In fact this inertia shock is greater than that caused by the tools in performing their function.

Machines, but for this limitation, are capable of running at higher speeds than has been possible by the method just described. Attempts have been made to increase this speed, the most successful, being those wherein driving wheels having varying diameters are utilized, thus producing different speeds. With such a driving wheel, the machine is started at the lowest speed and then when the parts are in motion, the speed is increased by driving the same from that portion of the wheel having a larger diameter. This method requires more or less complicated mechanism and valuable time is lost in shifting from one speed to another, so that this solution of the problem has not been entirely satisfactory.

In this invention I have provided a simple and efficient device to produce the desired result with the use of a single wheel, wherein the hub of the wheel is separate from the rim and flange, but having a flexible connection therewith, hence the motion of the wheel is transmitted to the hub and through it to the driven parts gradually rather than instantaneously. In addition to this, I have provided a simple friction mechanism to prevent any vibrations of the wheel mechanism, or the machines with which it is associated.

Figure 2:
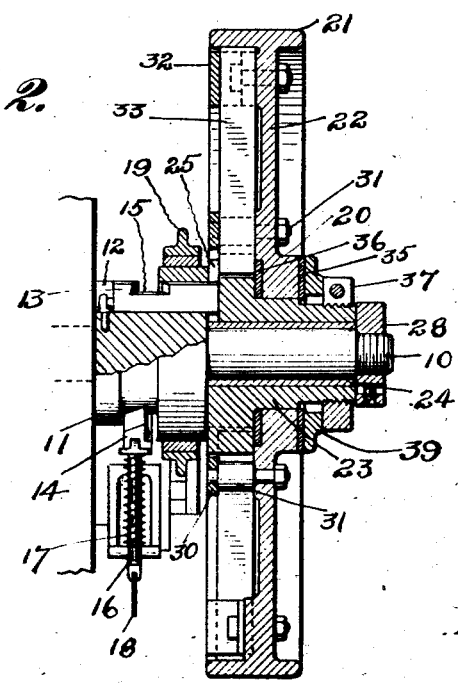
Figure 2 is a transverse sectional view thereof upon a plane substantially corresponding with line 2—2 of Figure 1.

In the embodiment of the invention herein shown, which is only one of the many forms my invention assumes, 10 indicates a portion of a driven shaft, having a collar 11 thereon, and axially slidable in a slot 12 therein is a clutch key or dog 13. This key or dog is moved to the right, as shown in Figure 2 by spring mechanism (not shown) and to the left by the clutch lever 14, the end of which is moved into and out of the path of the notch 15 in the key or dog 13, through a rod 16, which is connected with the lever at one end and surrounded by a coil spring 17, being pulled downwardly through the link 18 either manually or by other means as may be desired.

The mechanism above described is old and constitutes no part of this present invention.

In practice, the key or dog 13 is moved into the slot in the face of the hub of the driving wheel by a spring and thus forming a connection between the wheel and shaft. It is withdrawn so that the wheel may rotate without imparting movement to the shaft through manipulation of the clutch lever 14 through the rod 16.

A slidable friction brake mechanism 19 is applied to the collar 11 to operate in a well known manner.

My improved wheel is constructed with a hub 20, a rim 21 and a web 22. The hub 20 is journaled upon the hub 23, in which is a bushing 24 that is rotatably mounted upon the shaft 10. In the face of the hub 23 is the usual radial slot 25 and adjacent to the edges thereof are two key plugs 26, the inner faces 27 of which are in the path of the key or dog 13. Endwise movement of this hub on the shaft is prevented by the nut 28. In the peripheral wall of this hub, near the inner end, are a plurality of notches 29, shown herein as four in number, but may be more or less, which are narrower at the bottom than the top, and with straight or curved side walls as may seem most desirable.

Figure 1:
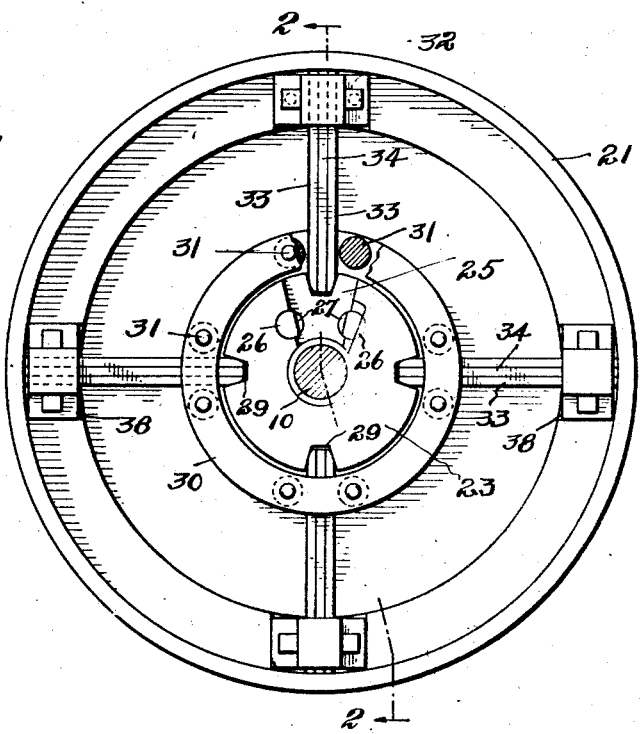
Figure 1 is an elevation of my new and improved wheel.

Fixed to the web 22 by the studs 31 is a ring 30. These studs are so formed as to space the ring 30 from the web 22 and are preferably located in pairs substantially as shown in Figure 1, with an open space therebetween.

Secured to the web 22 by a clamp 32, are one or more sets of springs, each being constructed with leaves 33 and 34, which project inwardly toward the hub 23 through the open space between each of the studs 31 and into one of the notches 29 in the hub. Each of the clamps 32 is set in a radial recess 38, which provides a strong and rigid base for the springs.

In the wheel illustrated there are three leaves in each of the springs, but within my invention, a greater or less number may be used and as may seem best adapted for the type of wheel with which they are to be associated.

The open space between each of the pairs of studs 31 is greater than the overall width of the spring, so that there is a slight movement therebetween, and to accommodate this movement the inner ends of the outside leaves 33 are slightly rounded or beveled, thus providing a flexible joint and maintaining contact of the movable parts without lost motion. The wheel is constantly rotating and with it the hub through the flexible connection therebetween.

When the key 13 is moved into the radial slot 25 of the hub one key plug 26 is almost instantly brought into contact therewith, and as the hub is rotating, this movement is transmitted to the shaft, which thereafter is rotated at the same speed as the balance wheel. However, the motion of starting the shaft is not instantaneous, because the connection between the wheel and the hub is through the groups of leaf springs, which absorb the inertia of the balance wheel and gives the shaft an easy start, which becomes full speed when the leaf springs have yielded to their capacity. These springs are heavy enough to absorb the balance wheel inertia within the limit of their deflection, or to such a point where they contact with the studs 31. These latter, however, limit the deflection of the springs under an abnormal condition that might be sufficient to break or set the springs. Thereafter the wheel and shaft move as a unit. To insure a steady motion between the hub and wheel, so that the parts will always maintain their contact therewith irrespective of the degrees of labor upon the shaft, I have provided a friction device, which consists of the rings 35 and 36, preferably made of fibre, and upon opposite sides of the hub 20, the extent of pressure of these washers against the face of the hub 20 being variable by the clamp nut 37 threaded on the hub and between which and the ring 35 is a flange 39.

Without a friction mechanism, the wheel being driven at a constant angular velocity, the spring mechanism will pick up the shaft, compressing the springs to the same angular velocity, and then increase this velocity above that of the driving wheel. These several vibrations above and below the velocity of the wheel will continue until the entire mechanism adjusts itself to a constant velocity. Under such conditions, when the tools engage the workpiece this same action might occur and give a very serious vibration to the mechanism of the machine. With a friction mechanism, one of the many forms of which I have illustrated and described, there is always sufficient friction upon the parts to prevent these vibrations, and insure a smooth operation, at the highest speeds.

What I claim as new and desire to secure by Letters Patent, is:—

1. In combination with an inner member formed with radial recesses in its periphery, a wheel rotatable on said member, a plurality of groups of leaf springs having their inner ends freely disposed in the recesses of the inner member, means to independently secure rigidly to the wheel and as a unit the outer ends of the springs in each of the groups, and means secured to the wheel and disposed on the respective opposite sides of and spaced from the springs and formed to engage the said spring sides at points between the ends of the springs to flex the springs.

2. A construction in accordance with claim 1 wherein the inner ends of the springs are rounded on their opposite sides so as to be capable of rocking in the recesses.

3. In combination with an inner member a wheel rotatable on said member, spring connections between the inner member and the wheel to drive the member from the wheel, and friction means between the wheel and said inner member for limiting vibration above and below the velocity of the wheel until the velocity of the inner member reaches that of the wheel.

4. A construction in accordance with claim 3 wherein there is means provided for adjusting the limiting means and for fixing same in adjusted position.

5. In combination with an inner member a wheel rotatable on said member, a plurality of groups of leaf springs connected as a unit at their outer ends to the wheel means on the wheel disposed on opposite sides of the springs and spaced therefrom to flex the springs at points between the spring ends, and means on the inner member engageable with the inner ends of the springs so as to enable the said inner ends of the springs to rock relative to the inner member.

6. In combination with an inner member, a wheel rotatable on said member, a plurality of groups of leaf springs connected as a unit at their outer ends to the wheel, means on the inner member to engage the inner ends of the springs, a member engaging the outer sides of the springs to hold same against the adjacent side face of the wheel, and parts disposed in pairs and receiving the springs therebetween so as to cause flexure of the springs by engaging the latter at points between their ends, the space between the engaging faces of said parts being greater than the overall space occupied by the springs.

7. In combination with an inner member, a wheel rotatable on said member, leaf springs connected at their outer ends to the wheel and at their inner ends to the inner member, friction rings engaging opposite sides of the wheel, and means to mount the friction rings to cause same to frictionally engage the wheel.

8. In combination with an inner member, a wheel rotatable on said member, leaf springs connected at their outer ends to the wheel and at their inner ends to the inner member, a shoulder on the inner member, a friction element on the inner member abutting the shoulder and engaging the adjacent side face of the wheel, a second friction element abutting the opposite side face of the wheel, and means to secure the second friction element in position.

9. In combination with an inner member, a wheel rotatable on said member, leaf springs connected to the wheel and to the inner member, friction means engaged with a side face of the wheel, means on one side of the wheel to hold same and therewith the friction means against movement in one direction longitudinally of the inner member, and means carried by the inner member and disposed on the opposite side of the wheel to hold the wheel against movement in the opposite direction longitudinally of the inner member and to hold the wheel engaged with said friction means.

In testimony whereof, I have hereunto affixed my signature.

ZENAS P. CANDEE.